United States Patent [19]

Chapman et al.

[11] Patent Number: 5,774,650
[45] Date of Patent: Jun. 30, 1998

[54] CONTROL OF ACCESS TO A NETWORKED SYSTEM

[75] Inventors: Sydney George Chapman, Winchester; Michael George Taylor, Southampton, both of United Kingdom

[73] Assignee: International Business Machines Corporation, Armonk, N.Y.

[21] Appl. No.: 299,864

[22] Filed: Sep. 1, 1994

[30] Foreign Application Priority Data

Sep. 3, 1993 [GB] United Kingdom .................. 9318331

[51] Int. Cl.[6] .................................................. G06F 11/34
[52] U.S. Cl. ................ 395/186; 395/187.01; 395/188.01
[58] Field of Search .................................. 395/575, 287, 395/180, 477, 490, 726, 856, 187.01, 186, 188.01; 380/3, 22, 23, 24, 25, 50; 340/825.3; 379/200, 188, 189

[56] References Cited

U.S. PATENT DOCUMENTS

| | | | |
|---|---|---|---|
| 4,087,856 | 5/1978 | Attanasio | 395/401 |
| 4,135,240 | 1/1979 | Ritchie | 364/200 |
| 4,218,738 | 8/1980 | Matyas et al. | 364/200 |
| 4,672,572 | 6/1987 | Alsberg | 364/900 |
| 4,677,434 | 6/1987 | Fascenda | 380/23 |
| 4,771,461 | 9/1988 | Matyas et al. | 380/24 |
| 5,249,230 | 9/1993 | Mihm, Jr. | 380/23 |
| 5,276,901 | 1/1994 | Howell et al. | 395/800 |
| 5,402,490 | 3/1995 | Mihm, Jr. | 380/21 |
| 5,469,576 | 11/1995 | Dauerer et al. | 395/186 |
| 5,564,016 | 10/1996 | Korenshtein | 395/186 |

OTHER PUBLICATIONS

"Winshield for Windows 95 User Guide" 1995, pp. 1–12.

*Primary Examiner*—Phung M. Chung
*Attorney, Agent, or Firm*—Edward H. Duffield; Brian F. Russell; Andrew J. Dillon

[57] ABSTRACT

A method and data processing system are disclosed for controlling the access of a plurality users to a computer system connectable over a network to a plurality of computers. The data processing system has facilities for restricting user access to the data processing system which includes a user authentication procedure in which at logon a user's identity is compared with a list of authorized users. In addition, the data processing system has a system-wide profile referenced by all users of the system at logon and temporary access control facilities for temporarily preventing access to the system by a normally authorized user or users. The temporary access control facilities allow a privileged user of the computer system to create a list of temporarily unauthorized users that is referenced by the system-wide profile at logon.

17 Claims, 3 Drawing Sheets

CONTROL OF ACCESS TO A NETWORKED SYSTEM

BACKGROUND OF THE INVENTION

1. Field of the Invention:

The invention relates to networked computer systems, and particularly to temporary restriction of access to such systems.

2. Description of the Prior Art:

In a computer network, a single system may provide resources to a plurality of users connected to the system over a network. On occasions the system may become so overloaded that a particular user or users cannot operate effectively, and it may be necessary to restrict access to the system resources by some or all users for a period of time.

In most multiuser systems, a file or files listing valid usernames, or valid combinations of usernames and passwords are kept, and a user gains access to the system by supplying such a name and password when he logs on.

One simple prior art method of temporarily preventing a user from accessing system resources is to log the user off (if necessary) and reset his logon password, preventing him from regaining access. However, this is generally undesirable for reasons of administration and security. Many systems would not allow the user's original password to be reissued, so that the user would have to be notified of the new password to regain access.

Another prior art method of preventing a user from logging on is to remove his username from the file listing authorized users. (This is similar to the standard method of deleting a user permanently from a system, in which in addition a user's data files, if any, would be deleted to release system resources). Normal access would be restored by reinstating the user's name in the list of authorized users. A disadvantage of this method is the possibility of data loss, especially if the file containing usernames contains other critical data which is also erased.

To facilitate reinstating access in the above method, the file listing authorized users could be backed up (i.e. copied to a secure location) prior to deleting any users' entries in the active copy checked at logon. To restore the system to its original state, the backed-up file would be copied back to its original location. However, if the original copy were lost, it might be difficult to reinstate access. It is clearly preferable not to alter the files containing usernames or passwords.

For example, in IBM's AIX operating system, which is a type of UNIX operating system, a file called "/etc/passwd" contains the listing of usernames, and references to a further file containing encrypted passwords. Loss of this file prevents ANY further logon to the system; recovery entails a reinstallation of the operating system. W. R. Stevens' book "UNIX Network Programming", Prentice-Hall 1990, may be referred to for further details of the UNIX operating system.

This method has other deficiencies. For example, during the period of access restriction, the addition of a new user or permanent deletion of an existing user would frequently need to be reflected in both the backed-up and the active versions of the system file. Further, on attempting to log on, a normally authorized user temporarily denied access by this method would receive the same 'invalid logon' message, if any, which is presented to a permanently unauthorized user.

Some systems allow access to certain files rather than a logon session to be restricted. For example, in AIX a user could be temporarily prevented from accessing his own data files (his "home directory"). This could be done by changing the "access mode" for the directory, and restoring it at a later time. In AIX, this would necessarily remove access for any user to that data, and might prevent a second user from executing his desired tasks, if he happened to be relying on access to the first user's directory. Moreover, denying data access does not necessarily achieve the desired end, as the first user could still execute programs stored elsewhere, and thus take up processor time. Again, the message to the first user on attempting to access his files would be unhelpful, as it would merely inform him that he was unable to access his files, not that a temporary access restriction was in force.

This invention seeks to provide a system in which access can temporarily be restricted, for example, to allow the system owner to complete a resource-intensive task, can easily be reinstated, and mitigates the disadvantages of prior art solutions.

SUMMARY OF THE INVENTION

According to the invention, this is accomplished by a computer system connectable over a network to a plurality of users, the system comprising:

normal access control means for restricting user access to the system, the control means comprising a user authentication procedure which at logon the user's identity is compared with a first definition of authorized users;

system-wide profile means referenced by all users of the system at logon; and temporary access control facilitation means for temporarily preventing access to the system by a normally authorized user or users, the facilitation means allowing a privileged user of the system to create a second definition of temporarily unauthorized users, which second definition is referenced by the system-wide profile means at logon.

This invention enables a privileged user, such as a system owner, to control user access to the system, so that he can restrict access as and when required. The temporary access control facilitation means, such as an access control program executable only by a privileged user, temporarily prevents users normally able to access the system, but currently logged off, from gaining access. Temporarily unauthorized users already logged on to the system could also be logged off, possibly after a grace period or warning. Means for logging off current users are not however essential to the invention. A key characteristic which distinguishes this invention from the prior art is that a definition of temporarily authorized users separate from the definition of normally authorized users is provided, so that user account information need not be modified.

The invention allows a privileged user on a temporary basis either to partially restrict access, or to prevent access by all other users, allowing him to use the full performance capability and resources of the system.

This solution allows for easier restoration of access to the system, which could be automatic at a specified time. Furthermore, users could be provided with appropriate information such as why they are being denied access, by whom or for how long.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

A preferred embodiment of the invention will now be described, in relation to a UNIX system. UNIX is a multiuser, multitasking operating system, whose popularity stems from its powerful and flexible user interfaces, and from its standardization across many vendors' platforms. IBM's version of UNIX is AIX, but because of the standardization of UNIX, many details of the following description will apply equally to other UNIX versions.

Figures 1, 2:
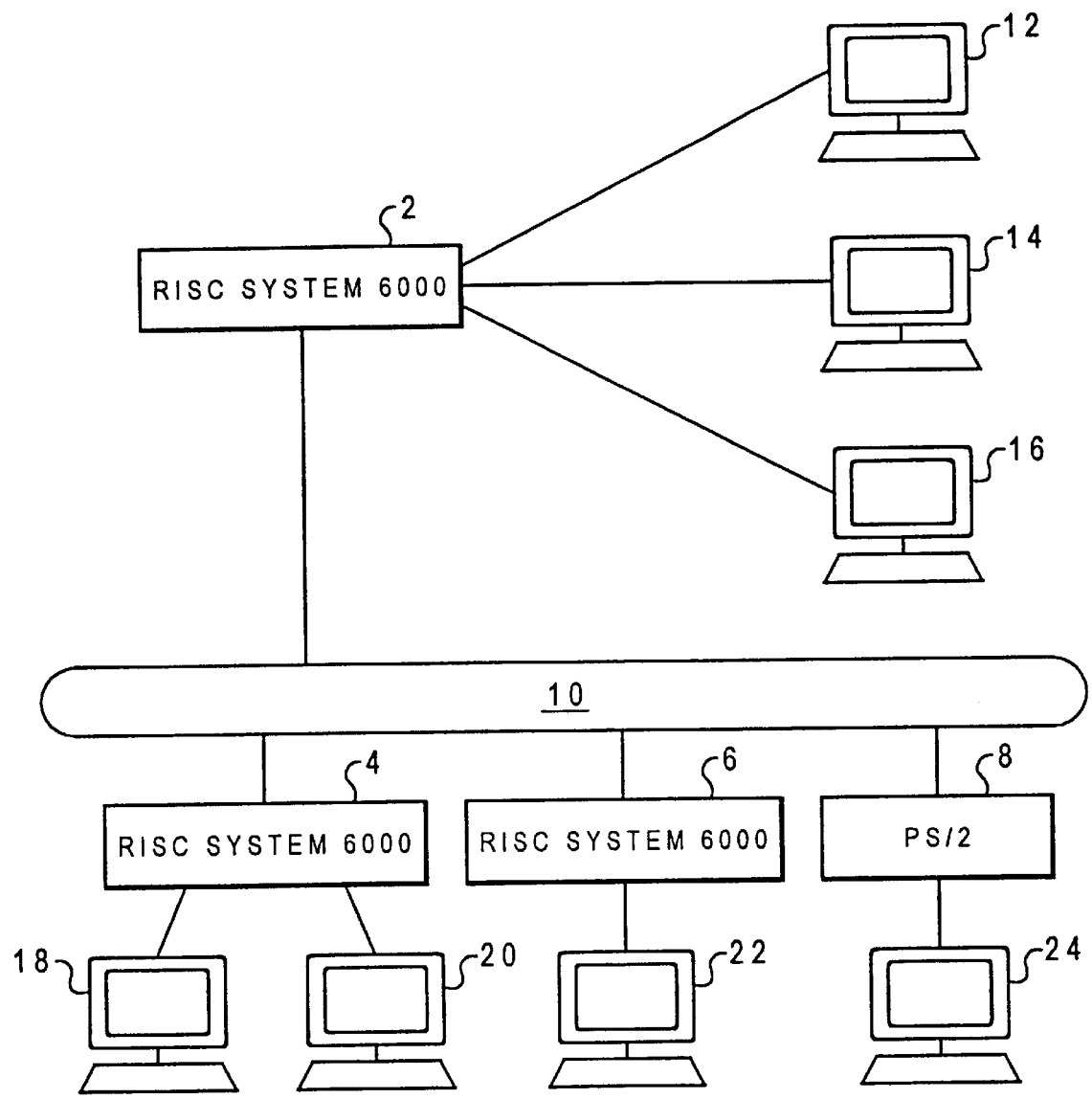
FIG. 1 shows an example of a very simple computer network.
FIG. 2 is an example of an AIX file containing users' account data.

FIG. 1 is an illustration of a small and very simple computer network, in which four systems 2, 4, 6, 8 are connected together by means of cabling 10. The systems are shown as being connected together in a ring configuration, although other configurations are equally possible and widely known, and other data transmission means might replace physical cabling, for example to allow connection to more distant locations. Each system 2, 4, 6, 8 provides for one or possibly more dumb terminals 12, 14, 16, 18, 20, 22, 24 to be attached. A user enters data at a terminal, typically including username and password to gain access to resources on the network. In the example shown, three systems 2, 4, 6 are shown as IBM RISC System/6000 series systems, and the fourth system 8 is shown as an IBM PS/2 series system; these systems are commonly used to run IBM's AIX operating system. (AIX, RISC System/6000 and PS/2 are trademarks of International Business Machines Corporation). The RISC System/6000 systems are relatively powerful and might be used by several users. For example, one such RS/6000 2 has three users directly attached (or "local") terminals 12, 14, 16 and could be set up to allow further use of its resources via the other ("remote") terminals 18, 20, 22, 24 connected to it via the network. The PS/2 system 8 would typically be less powerful and might be used only by a directly attached user at terminal 24, who could be authorized to use other resources on the network, and might even use the PS/2 system 8 primarily to handle communications with remote resources. For the purposes of this invention there will be no need to distinguish between local and remote users of a system, so that "connection over a network" will be taken to encompass both types of connection.

UNIX systems in general allow multiple users connected to a system over a network to logon to the system to use its resources. On occasions this may cause the system to become so overloaded that a particular user or users, such as a system owner (who might frequently be a local user but could equally be a remote user), cannot operate effectively. This inability to limit demand on the system resources may be particularly troublesome when the owner wishes to use the system for a resource-intensive task, or accurately measure performance characteristics of a task.

Therefore, there is a need for a privileged user, such as a system owner, to be able to limit demand on the system resources for a period of time.

All UNIX systems have the concept of a "superuser". (The superuser is also referred to as having "superuser authority"). The superuser is the privileged user in this embodiment. A superuser has greater authority than normal users, in that he can access resources (files, for example) which are owned by another user. He can add users to the system, delete users from the system, and change the access rights of any other user. He can also terminate "processes" (running programs) owned by any user, by using the UNIX "kill" command, whereas normal users can only kill their own processes.

To aid in understanding the preferred embodiment, some relevant characteristics of UNIX systems will now be described.

When it is desired to add a new user to a UNIX system, a "user account" is created. The user account can be considered to be made up of two parts:

Firstly, in all UNIX systems there is a file, in AIX it is entitled/etc/passwd 30, which defines user accounts and their characteristics. An entry in the file enables the user to be granted access to the system following authentication by means of a password.

Secondly, there is the user's home directory in which the user may store his own programs and data.

FIG. 2 shows an example of a user account file, /etc/passwd file 30, for an AIX system with just 3 users, Mike, Syd and Fred. The /etc/passwd file 30 contains 1 record for each user, the structure of which is as follows:

A first field 31 gives a unique user's identifier or name, such as 'mike', which the user supplies at logon to identify himself to the system. A second field 32 is for user authentication at logon. In IBM's AIX version 3, this field contains an exclamation mark, indicating that another (more secure) file contains the encrypted password for the user. In some other versions of UNIX and earlier versions of AIX, this field actually contains an encrypted version of the password. The exact nature of the authentication method is irrelevant to this invention, and a number of other alternatives are possible. The third field 33 contains a user number, which further identifies a user. This is often (but not necessarily) unique to a user. In AIX, a superuser is denoted by a user number of zero, and there may be more than one superuser.

The fourth field 34 is a number which identifies a group to which the user belongs. Typically, several users might have the same entry in this field, which could be, for example, a department number. The fifth field 35 is a text field, the contents of which are non-essential; it might be used by a system administrator to give the full name of the user, for example. The sixth field 36 specifies the user's home directory, which is the directory in which the user will find himself at the successful completion of logon. The seventh and last field 37 contains the initial program or "shell". The user's initial program is run when the user logs on, after the user's environment has been initialized and the user has been placed in his home directory. (In UNIX, a shell is a command interpreter, which must be running for a user to have an interactive logon session). More information about the user's initial program will be given in the explanation of the logon procedure.

Also, in all UNIX systems there is an initialization procedure which is run during each logon session for any user of the system, and may therefore be described as "system-wide". In the IBM AIX operating system this program is stored in a file called/etc/profile. This file is provided for a privileged user such as a system owner or administrator to specify additional functions to be provided to all users at logon. Accidental loss of or damage to this file during the course of modifying it would not usually have disastrous consequences (it would not prevent logon, for example). However, it is usually undesirable for many users to have authority to access this file, since by modifying it they could cause other users' data to be corrupted. One must normally be a superuser or have superuser authority to modify this system-wide profile.

In the preferred embodiment of this invention, code is added to the system-wide profile which temporarily causes unauthorized users to be denied access when they attempt to logon, and allows for the display of a message to the user giving information about the access restriction.

The UNIX Logon Sequence

Figure 3:
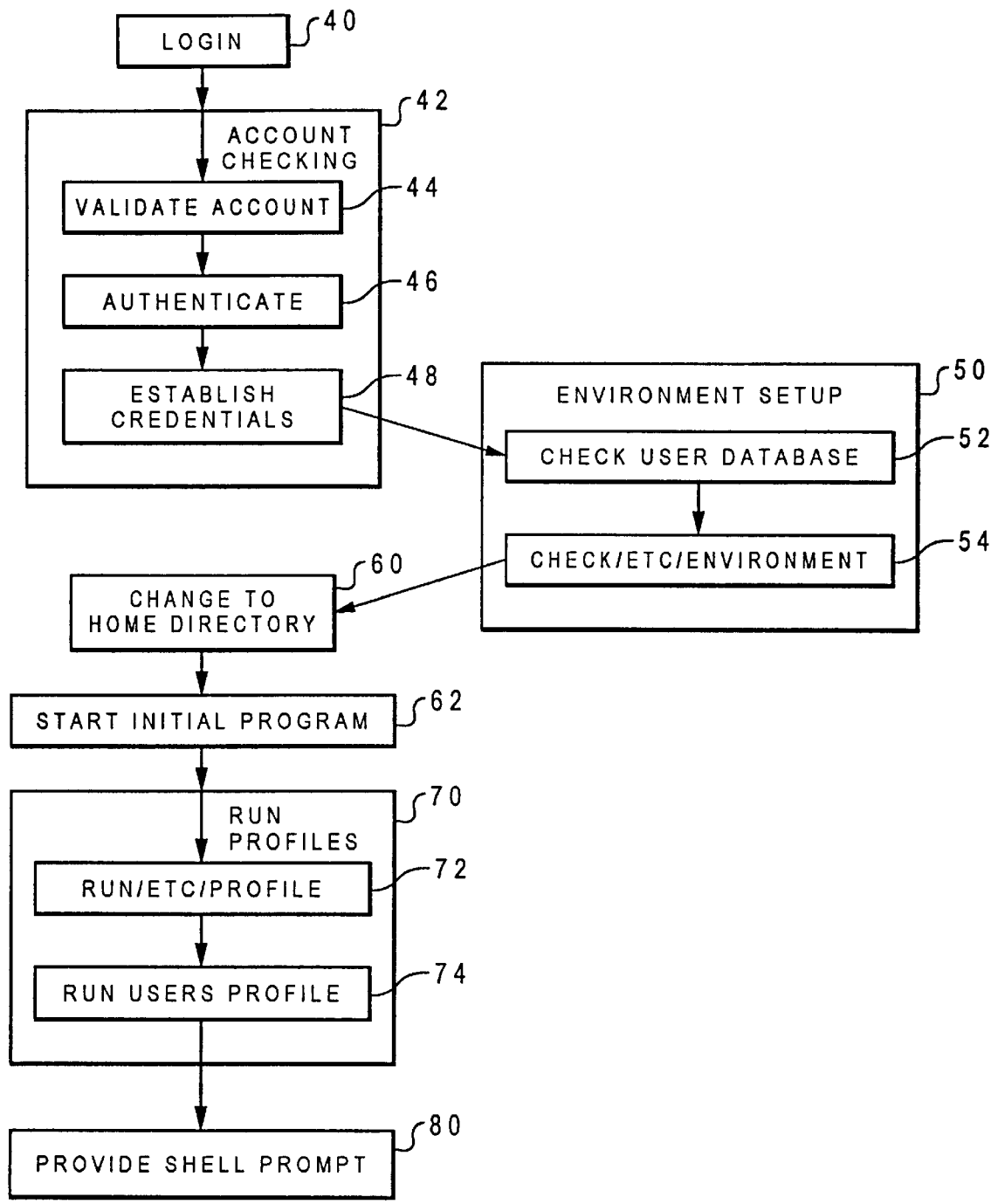
FIG. 3 is a schematic of the AIX logon sequence.

Some further description of the UNIX logon sequence will be helpful in understanding the preferred embodiment of the invention. This description will be based on the AIX logon sequence, with reference to FIG. 3 which is a schematic thereof.

A terminal 12, 14, 16 directly connected to an active UNIX system 2 will normally have a login prompt, or in the case of a remote terminal 18, 20, 22, 24, a session can be opened with the remote system 2 using a commonly understood protocol, and a login prompt obtained. In AIX, when a user enters a string at the login prompt, the "login" command 40 is invoked, which performs the steps of checking 42 account details, setting up 50 the user's environment, placing 60 the user in his home directory, starting 62 the user's initial program, running profiles 70, and providing 80 a prompt at which the user may enter commands. These steps will now be described in more detail.

The step 42 of checking account details comprises the steps of: validating 44 the user's account, in which the/etc/passwd file 30 is referenced to check that a username 31 exists matching the username supplied by the user who is attempting to gain access; authenticating 46 the user, in which the user's identity is verified by comparing the encrypted true password 32 corresponding to the validated username 31 with an encryption of the password supplied by the user who is attempting to gain access, and establishing 48 credentials, which are stored in a user database and define the user's accountability and access rights to files on the system 2.

This step 42 of checking account details is therefore the step at which it is normally determined whether or not a user is to be granted access to the system 2 and allowed to proceed with the later steps in the logon sequence. As will be discussed later, in the preferred embodiment of the present invention a user may be denied access at a later stage.

The step 50 of setting up the user's environment is not particularly relevant to the invention. Briefly, it comprises initializing the user environment from the user database 52 and from a configuration file called/etc/environment 54. This provides the user with his desired environment, specified by a number of system variables. For example, one variable determines the user's language.

The user is then placed 60 in the directory 36 which is specified in the/etc/passwd file 30 as his home directory, from within which the user's initial program 37, again specified in the/etc/passwd file 30, is run 62. In AIX the initial program 37 is restricted to being one of those listed under "shells" in the file/etc/security/login.cfg. The initial program 37 provides the user with a command line interface, which interprets his entered commands.

Next, programs referred to as profiles are run 70. The first profile to be run is the system-wide profile/etc/profile 72, previously mentioned. If there is a file called profile in the user's home directory 36, this is run 74 subsequently. This file contains functions which the user himself can specify to be provided during each logon.

Finally, a "shell prompt" is provided 80, at which the user may enter commands. This completes the description of the AIX logon sequence of FIG. 3.

Temporary Restriction of Access

Figure 4:
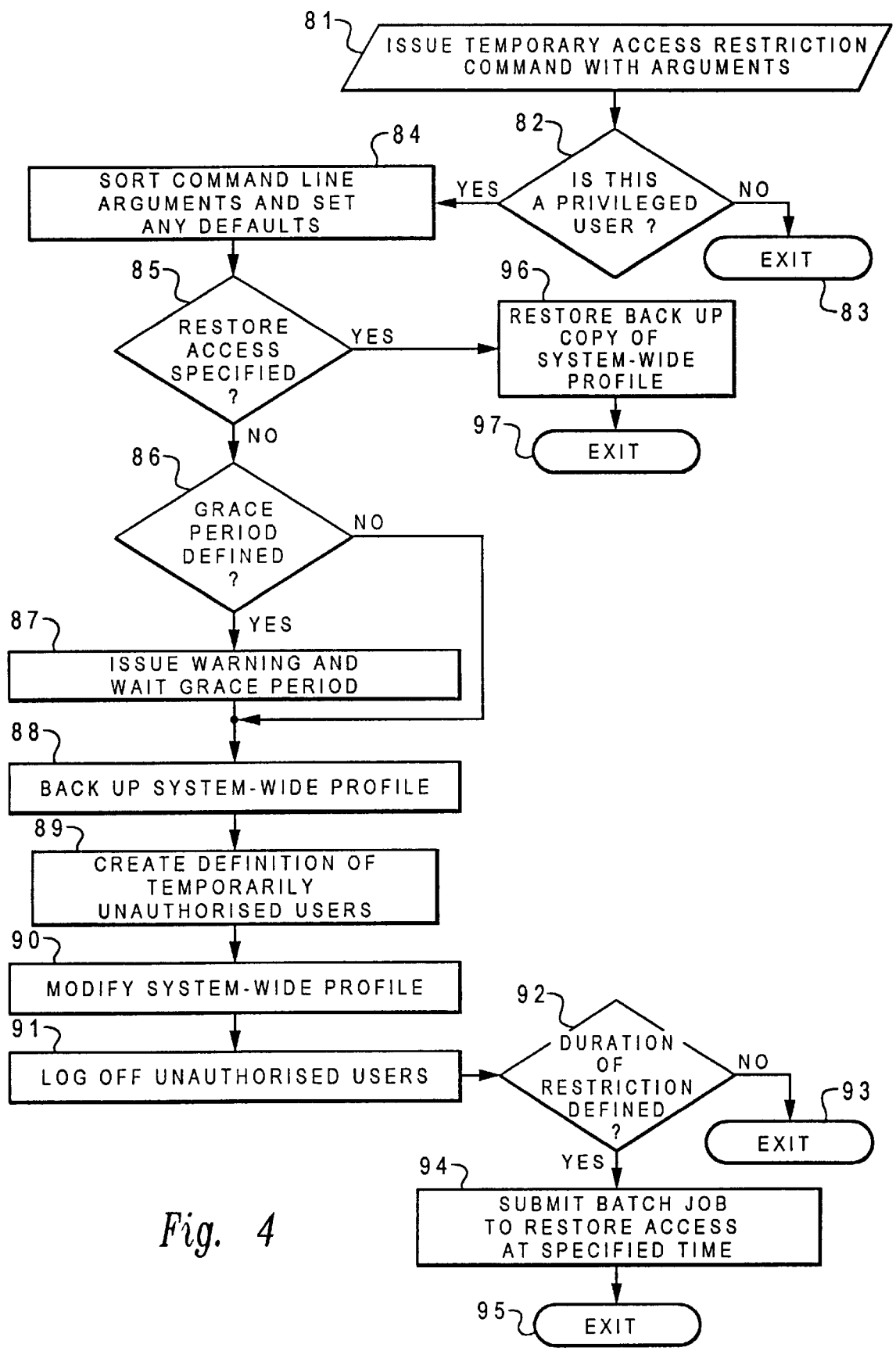
FIG. 4 is a schematic of the method of this invention.

Having provided the necessary background, the method of the preferred embodiment of the invention will now be described in detail for an AIX system, with reference to the schematic in FIG. 4.

Preferably, the steps would be executed under the control of an access control program, which would run on the system to which access was to be restricted and would provide for a privileged user to enter the necessary data, for example at a command line or prompt as described below, on a menu screen or screens, by the use of a mouse or other suitable means.

The method comprises the following steps:

1) Invoke 81 the access control program. It is assumed here that the access control program is started by entering a command having a number of parameters or arguments.
2) Check 82 that the user of this program is privileged to do so, and exit 83 otherwise.

In UNIX terms the privileged user must have superuser authority. In AIX, this is the case if the unique user identification number 33 is zero. It is possible for more than one user to have superuser authority.
3) Sort out 84 the command line arguments supplied, and set parameters indicating:
   a) User(s) to be permitted access
   b) Duration of access restriction, which could be indefinite
   c) Grace period for users to complete work
   d) Whether access is to be restricted or restored
   and set defaults for parameters not explicitly supplied, or for parameters to be overridden. For example, defaults ensuring a minimum grace period, or maximum duration of access restriction may be desirable.
4) Check d) to establish 85 whether access is to be restricted, or restored following a previous access restriction. The case in which access is to be restored will be discussed later.
5) Check c) to establish 86 whether a grace period is defined and if so 87 issue a warning to users notifying them of the impending access restriction and wait for the grace period.

The notification could include any useful information available to the program or supplied by the privileged user, such as the name of the privileged user who initiated the access restriction, the users affected, the grace period, the duration of the access restriction, or the reason for the restriction.
6) Make 88 a backup copy of the system-wide profile (/etc/profile).
7) Check a) and create 89 a definition of temporarily unauthorized users, by any appropriate method.

For example, a list of temporarily unauthorized, or temporarily authorized usernames could be constructed (the latter could even include invalid usernames, since the account validating step 44 of the logon sequence would ensure these were not admitted), or the user number 33 could be required to be within a specified interval. The privileged user executing this program would always be included!
8) Modify 90 the system-wide profile/etc/profile.

This may involve the addition of code to /etc/profile, which would effect the steps of checking whether a user logging on is temporarily unauthorized according to the definition, and if so, displaying a message and logging him off, (using the "kill" command explained in the next step). Obviously, /etc/profile could be permanently adapted to search for such a definition, which might be vacuous, or might not necessarily exist.

Since the system-wide profile is referenced by each and every user at logon, such a modification prevents any temporarily unauthorized user currently logged off the system from gaining access.

9) Log off temporarily unauthorized users already logged on to the system 91.

In AIX, a user may have one or more "processes" or programs running simultaneously, each of which has a process identification number (PID) which is associated with the user's name 31 and number 33. Logging off the user involves terminating all his processes. A "ps" command lists existing processes and their associated usernames 31 and numbers 33. Thus processes owned by users defined as temporarily unauthorized may be identified; termination is accomplished by passing the PIDs to the "kill" command. As previously mentioned, only a user with superuser authority can kill other users' processes.

10) Check b) to establish 92 whether a definite duration was specified for the access restriction. If a definite duration is specified, submit 94 a batch job to restore access at the appropriate time (using the AIX "at" command), and then exit 95 the access control program. If the duration is indefinite, exit 93 the access control program without submitting a batch job.

Restoration of Access

To restore access to the system following a temporary restriction, it is necessary to ensure that the system-wide profile no longer causes access to be denied to normally authorized users attempting to logon. This will also ensure users logged off by the access control program are able to regain access.

Restoration is most easily done by reversing the modifications 90 to the system-wide profile, by replacing the modified profile with the backup copy previously made 88. Alternatively, the definition of temporarily unauthorized users could be modified or deleted, or the system-wide profile could be prevented from accessing the definition. If desired, access could be partially restored by modifying the definition to specify a smaller set of temporarily unauthorized users.

In this embodiment the access control program can be invoked 81 again by the privileged user with a "restore" parameter and will replace 96 the modified system-wide profile with the clear backup copy. If a definite time was specified for the restoration of access, it is not necessary for the privileged user to intervene again; the access control program submits 94 a batch job to automatically replace the system-wide profile at the specified time.

It may be noticed that a user could also be denied access by replacing his initial program 37 by a program logging him off (which would have to be listed in /etc/security/login.cfg). This is not considered desirable, as the user's initial program is usually not system-wide, and the method would involve modifying the critical/etc/passwd file, or replacing the contents of eg. /bin/ksh with the program logging him off. It would however allow a more helpful message to be given.

Although the preferred embodiment described uses an access control program to perform the necessary operations, other alternatives could be envisaged by a person skilled in the art. It would, for example, be possible to use separate programs to restrict and restore access, or indeed for the privileged user to manually perform some of the operations. Other alternatives might include replacing the single definition of temporarily unauthorized users with two different definitions, one for users currently logged on and another for users already logged off.

Also, a separate system-wide profile could be provided solely for temporary access restriction, rather than incorporating the functions in a larger profile, and the profile could if desired precede the normal access control procedure.

Although the preferred embodiment has been described in relation to a UNIX system, temporary access control means could be provided in any system in which user access is normally restricted by access control means referencing a definition of normally authorized users, and in which at least all users satisfying the normal access control means could refer to a shared or common profile at logon.

While the invention has been particularly shown and described with reference to a preferred embodiment, it will be understood by those skilled in the art that various changes in form and detail may be made therein without departing from the spirit and scope of the invention.

What is claimed is:

1. A data processing system connectable over a network to a plurality of computers, wherein said data processing system has a plurality of authorized users, the data processing system comprising:

means for restricting user access to the data processing system, said means for restricting access including means for performing a user authentication procedure in which, at logon, a user's identity is compared with a list of said plurality of authorized users;

a system-wide profile referenced by all users of the data processing system at logon; and means for temporarily preventing access to the data processing system by a particular user among said plurality of authorized users, wherein said means for temporarily preventing access permits a privileged user among said plurality of authorized users to create a list of temporarily unauthorized users including said particular user, said list of temporarily unauthorized users being referenced by the system-wide profile at logon, wherein the means for temporarily preventing access includes means for logging off users already logged on to the data processing system who are listed within said list of temporarily unauthorized users.

2. The data processing system as claimed in claim 1, wherein the means for temporarily preventing access selectively modifies the system-wide profile to cause said system-wide profile to reference said list of temporarily unauthorized users.

3. The data processing system as claimed in claim 1, wherein said means for temporarily preventing access causes the system-wide profile to provide information regarding the a temporary access restriction to said particular user temporarily denied access to said data processing system.

4. The data processing system as claimed in claim 1, wherein the means for temporarily preventing access selectively determines a grace period and issues a warning to users listed within said list of temporarily unauthorized users who are already logged on to the data processing system that access to the data processing system will be restricted on expiration of the grace period.

5. The data processing system of claim 4, and further comprising means for providing information to currently logged on users before logging them off the data processing system.

6. The data processing system of claim 5, and further comprising means for logging off users currently logged on the data processing system in response to expiration of the grace period.

7. The data processing system as claimed in claim 1, wherein the means for temporarily preventing access is operable to automatically reinstate access to selected users among said temporarily unauthorized users at a specified time.

8. The data processing system of claim 7, and further comprising means for automatically restoring the authorization for said temporarily unauthorized users.

9. The data processing system as claimed in claim 1, in which the data processing system utilizes a UNIX operating system.

10. The data processing system of claim 1, and further comprising means for restoring the authorization for said temporarily unauthorized users.

11. The data processing system of claim 1, and further comprising means for logging off users currently logged on the data processing system.

12. A method of temporarily preventing access to a data processing system connectable over a network to a plurality of computers, said data processing system having means for restricting user access to the data processing system, wherein said means for restricting access performs a user authentication procedure in which, at logon, the user's identity is compared to a list of a plurality of authorized users, said means for restricting access further having a system-wide profile referenced by all users of the data processing system at logon, the method comprising the steps of:

referencing a list of temporarily unauthorized users from the system-wide profile;

denying access to said data processing system to a user listed within said list of temporarily unauthorized users; and logging off users already logged on to the data processing system who are listed within said list of temporarily unauthorized users.

13. The method of claim 12, said method further comprising the step of providing information regarding a temporary access restriction to a user temporarily denied access to said data processing system.

14. The method of claim 12, said method further comprising the steps of:

determining a grace period; and issuing a warning to users listed within said list of temporarily unauthorized users who are already logged on the data processing system that access to said data processing system will be restricted upon expiration of the grace period.

15. The method of claim 12, said method further comprising the step of automatically reinstating access to selected users among said temporarily unauthorized users at a specified time.

16. In a data processing system connectable over a network to a plurality of computers, the improvement comprising:

temporary access control facilitation means for temporarily disallowing a user access to the system, wherein said temporary access control facilitation means includes:

a list of authorized users to be temporarily unauthorized to logon to said data processing system;

means for restricting access to the data processing system for users on said list; and means for logging off users already logged on to the data processing system who are listed within said list of temporarily unauthorized users.

17. The data processing system of claim 1, said system-wide profile further comprising means for initializing all users before allowing said users access to the data processing system, wherein said system-wide profile invokes said means for restricting user access before initializing a user.

* * * * *